(12) United States Patent
Kuo et al.

(10) Patent No.: US 7,563,023 B2
(45) Date of Patent: Jul. 21, 2009

(54) DIGITAL TEMPERATURE DETECTING SYSTEM AND METHOD

(75) Inventors: Hung-Yi Kuo, Taipei (TW); Chia-Hung Su, Taipei (TW)

(73) Assignee: Via Technologies, Inc., Taipei (TW)

( * ) Notice: Subject to any disclaimer, the term of this patent is extended or adjusted under 35 U.S.C. 154(b) by 92 days.

(21) Appl. No.: 11/682,761

(22) Filed: Mar. 6, 2007

(65) Prior Publication Data

US 2008/0136453 A1 Jun. 12, 2008

(30) Foreign Application Priority Data

Dec. 6, 2006 (TW) ............................. 95145478 A

(51) Int. Cl.
*G01K 7/00* (2006.01)
(52) U.S. Cl. ...................... 374/170; 327/512
(58) Field of Classification Search ................. 374/170; 327/512
See application file for complete search history.

(56) References Cited

U.S. PATENT DOCUMENTS

| | | | | |
|---|---|---|---|---|
| 4,107,667 A | * | 8/1978 | Kronlage | 341/167 |
| 4,117,722 A | * | 10/1978 | Helmstetter | 374/171 |
| 4,448,549 A | * | 5/1984 | Hashimoto et al. | 374/170 |
| 4,602,871 A | * | 7/1986 | Hanaoka | 374/102 |
| 5,899,570 A | * | 5/1999 | Darmawaskita et al. | 374/170 |
| 6,695,475 B2 | * | 2/2004 | Yin | 374/171 |
| 7,331,708 B2 | * | 2/2008 | Blom et al. | 374/171 |
| 7,452,128 B2 | * | 11/2008 | Franch et al. | 374/178 |
| 2008/0238563 A1 | * | 10/2008 | Kim et al. | 331/176 |

FOREIGN PATENT DOCUMENTS

TW I236529 2/1993

* cited by examiner

*Primary Examiner*—Gail Verbitsky
*Assistant Examiner*—Mirellys Jagan
(74) *Attorney, Agent, or Firm*—Kirton & McConkie; Evan R. Witt

(57) ABSTRACT

A digital temperature detecting system for detecting a working temperature of a chip. The digital temperature detecting system includes a clock generator, for generating a first clock signal having a constant frequency; an oscillating circuit having a plurality of Not gates coupled in series, for generating a second clock signal, wherein a total number of the Not gates is an odd number; a command issuing unit connected to the clock generator, for generating a reference command signal according to the first clock signal, wherein a counting duration and a recovery duration are generated periodically in the reference command signal; and a command processing unit connected to the command issuing unit and the oscillating circuit, for generating a counting number through counting the clocks generated in the second clock signal in the counting duration and determining a working temperature according to the counting number.

12 Claims, 6 Drawing Sheets

US 7,563,023 B2

DIGITAL TEMPERATURE DETECTING SYSTEM AND METHOD

FIELD OF THE INVENTION

The present invention relates to a digital temperature detecting system and method, and more particularly to a digital temperature detecting system and method applied to detecting an internal temperature of a chip.

BACKGROUND OF THE INVENTION

In a computer system, the working temperature is a big concern for the computer system can work stable or not. If the working temperature of the computer system is over to a limit, the chip in the computer system may not be able to process data correctly, or the computer system may crash, or even the hardware of the computer system may be damaged. Therefore, a temperature detecting system, for detecting the working temperature of the chip, is usually equipped in the computer system.

FIG. 1 depicts a functional block diagram showing a prior-art temperature detecting system for detecting a working temperature of a chip. The temperature detecting system includes a converting circuit 10 and a thermal diode 12. The converting circuit 10 further includes an A-to-D converting unit 102 connected to the two terminals of the thermal diode 12, and a signal-to-temperature mapping unit 104 connected to the A-to-D converting unit 102. The thermal diode 12 can be designed in the chip (not shown) or attached on the chip.

A main characteristic of the thermal diode 12 is that a current flowing through the thermal diode 12 is related to the working temperature of the thermal diode 12, which means there is a specific equation between the current flowing through the thermal diode 12 and the working temperature of the chip. Basically, the current flowing through the thermal diode 12 is increasing with the working temperature of the chip. As depicted in FIG. 1, the current flowing through the thermal diode 12 varies with the working temperature of the chip if the thermal diode 12 is designed in the chip or attached on the chip. When the current is derived from the thermal diode 12, the current (an analog signal) is converted to a digital signal by the A-to-D converting unit 102, and the converted digital signal is further transmitted to the signal-to-temperature mapping unit 104. After the mapping processed by the signal-temperature mapping unit 104, a temperature corresponding to the value of the digital signal is generated, so as the working temperature of the chip is detected.

Conventionally, the temperature detecting system is implemented by both an analog circuit and a digital circuit. However, the analog circuit, compared to the digital circuit, usually takes up more layout area in a chip and also needs a more complicate circuit design.

For fixing the problems of the analog temperature detecting system taking up too much layout area in a chip and the analog circuit needing a more complicate circuit design, the present invention discloses a digital temperature detecting system and method for detecting the working temperature of a chip. Additionally, a gate delay time in the chip can be further estimated through the digital temperature detecting system and method of this present invention.

SUMMARY OF THE INVENTION

The digital temperature detecting system according to the present invention is comprised of a clock generator, an oscillating circuit, a command issuing unit, and a command processing unit. The clock generator generates a first clock signal having a constant frequency. The oscillating circuit further includes odd Not gates coupled in series for generating a second clock signal. The command issuing unit connects to the clock generator for generating a reference command signal according to the first clock signal, wherein a counting duration and a recovery duration are generated periodically in the reference command signal. The command processing unit connects to the command issuing unit and the oscillating circuit for generating a counting number through counting the clocks generated in the second clock signal in the counting duration and determining a working temperature according to the counting number.

The digital temperature detecting method of the present invention is comprised steps of: periodically generating a counting duration according to a first clock signal having a constant frequency; receiving a second clock signal derived from an oscillating circuit having a plurality of Not gates, wherein a total number of the Not gates is an odd number; and generating a counting number through counting the clocks generated in the second clock signal in the counting duration and determining a working temperature according to the counting number.

Moreover, the digital temperature detecting method of the present invention is comprised steps of: periodically generating a counting duration according to a first clock signal having a constant frequency; receiving a second clock signal derived from an oscillating circuit having a plurality of Not gates, wherein a total number of the Not gates is an odd number; and generating a counting number through counting the clocks generated in the second clock signal in the counting duration and determining a gate delay time according to the counting number.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

Figure 1:
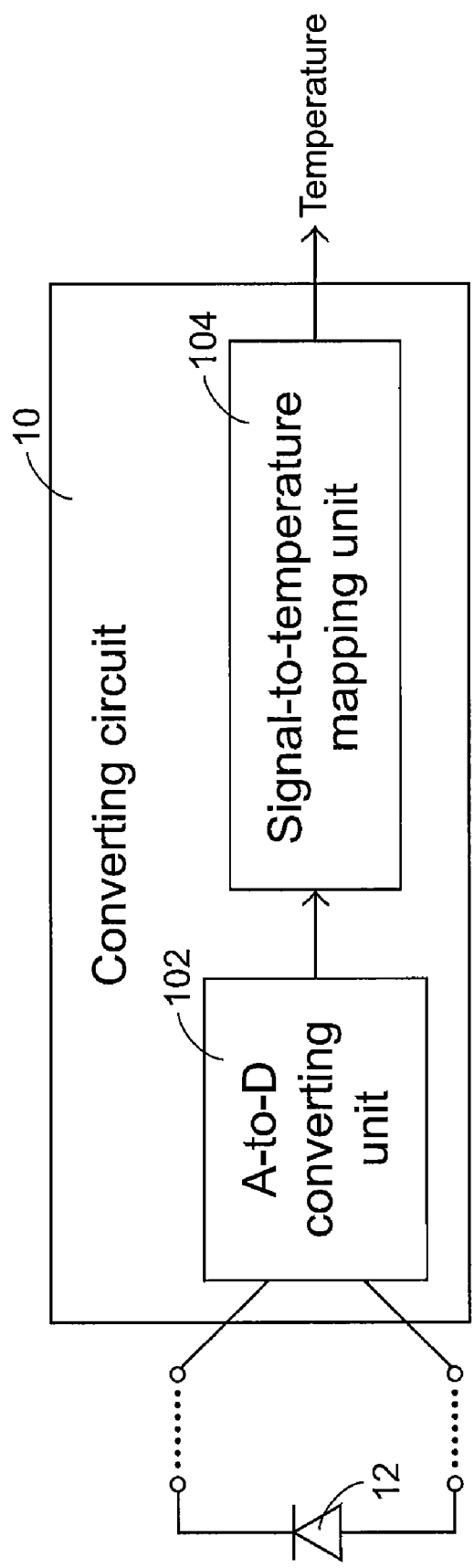
FIG. 1 is a functional block diagram showing a prior-art temperature detecting system for detecting a working temperature of a chip.
Figure 2A:
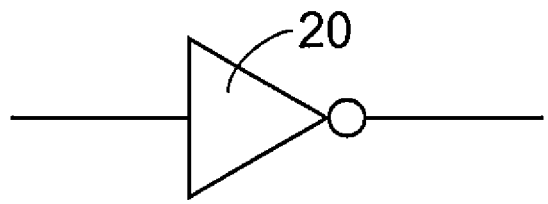
FIG. 2A is a diagram showing a Not gate.
Figure 2B:
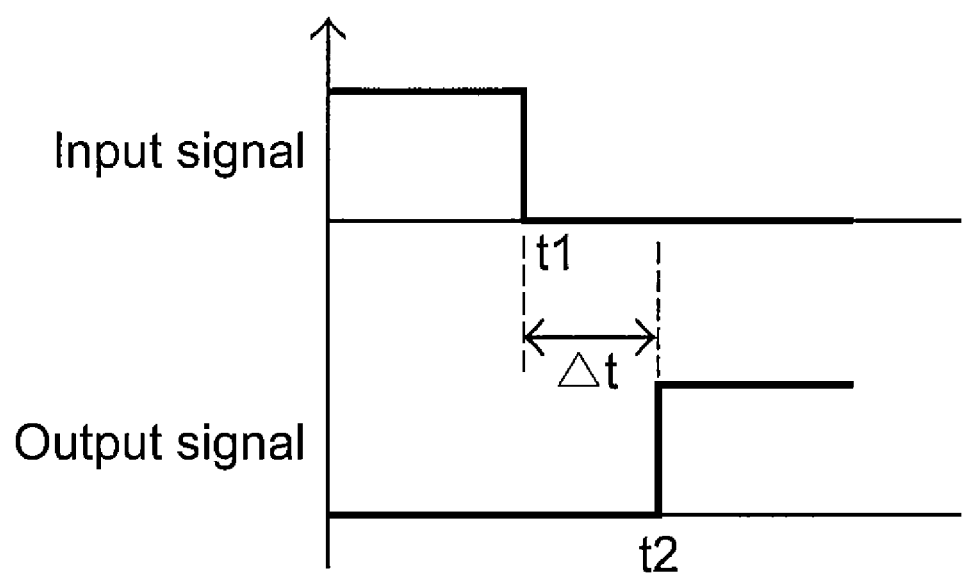
FIG. 2B is a timing diagram showing an input signal applied to the Not gate in FIG. 2A and an output signal in response to the input signal.

FIG. 2A depicts a Not gate 20 and FIG. 2B depicts a timing diagram showing an input signal applied to the Not gate 20 in FIG. 2A and an output signal in response to the input signal. Ideally, the output signal, derived from the output terminal of the Not gate 20, must be immediately turned from a logic low state (i.e., output signal=0) to a logic high state (i.e., output signal=1) in response to the input signal, applied to the input terminal of the Not gate 20, being turned from a logic high state (i.e., input signal=1) to a logic low state (i.e., input signal=0). However, as depicted in FIG. 2B, the time t2, the output signal turned from the logic low state (i.e., output signal=0) to the logic high state (i.e., output signal=1), is delayed from the time t1, the input signal turned from the logic high state (i.e., input signal=1) to the logic low state (i.e., input signal=0), by a gate delay time ($\Delta t$) of the Not gate 20. According to the physics characteristic of the integrated-circuit devices in the Not gate 20, the gate delay time ($\Delta t$) varies with the working temperature of the integrated-circuit devices in the Not gate 20, therefore, the gate delay time ($\Delta t$) of a chip also varies with the working temperature of the chip. In the prior-art chip, there is no specific device for measuring the gate delay time ($\Delta t$). The gate delay time ($\Delta t$) can be only estimated in the design phase of the chip, or estimated by a programming simulation after the chip is designed. However, designing mistakes may be resulted in if the gate delay time ($\Delta t$) cannot be measured physically.

Figure 3:
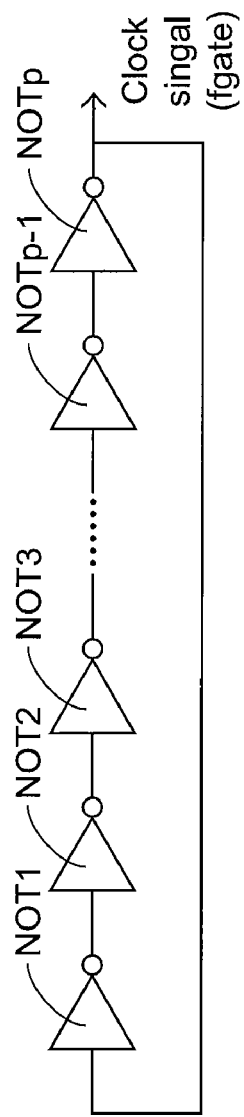
FIG. 3 is a diagram showing an oscillating circuit having P number of Not gates NOT1~NOTp coupled in series, and an output terminal of the Not gate NOTp fed back to an input terminal of the Not gate NOT1.

Accordingly, an object of the present invention to provide a digital temperature detecting system make use the characteristic of the gate delay time ($\Delta t$) of the Not gate 20 varying with the working temperature of the Not gate 20. FIG. 3 depicts an oscillating circuit including Not gates NOT1~NOTp, wherein NOT1~NOTp are coupled in series, P is odd, and an output terminal of the Not gate NOTp is fed back to an input terminal of the Not gate NOT1. Because P is odd, when an input signal in the logic high state (i.e., input signal=1) is applied to the input terminal of the Not gate NOT1, an output signal, in response to the input signal and derived from the output terminal of the Not gate NOTp, is in the logic low state (i.e., output signal=0). After the output signal in the logic low state (i.e., output signal=0) is fed back to the input terminal of the Not gate NOT1, an output signal varying in the two different logic states is derived repeatedly from the output terminal of the Not gate NOTp, so as the output signal can be regarded as a clock signal.

As explained above, the gate delay time ($\Delta t$) of the Not gate increases with the working temperature, so as the frequency of the clock signal $f_{gate}$ derived from the oscillating circuit decreases with the gate delay time ($\Delta t$). Therefore, through the $f_{gate}$, the object of the present invention to provide a digital temperature detecting system that measuring the working temperature of the chip and estimating the gate delay time ($\Delta t$) of each Not gate can be achieved.

For example, a clock generator (such as a quartz oscillator) outputs M clocks in a specific duration, wherein the clock generator is not affected by the working temperature and the frequency of the clock generator is a constant $f_{osc}$, and in the same duration, the Not gates NOT1~NOTp coupled in series output N clocks, then, the gate delay time ($\Delta t$) of each Not gate at a specific temperature can be got by $$M \times \frac{1}{f_{osc}} \times \frac{1}{N} \times \frac{1}{P}.$$

Figure 4:
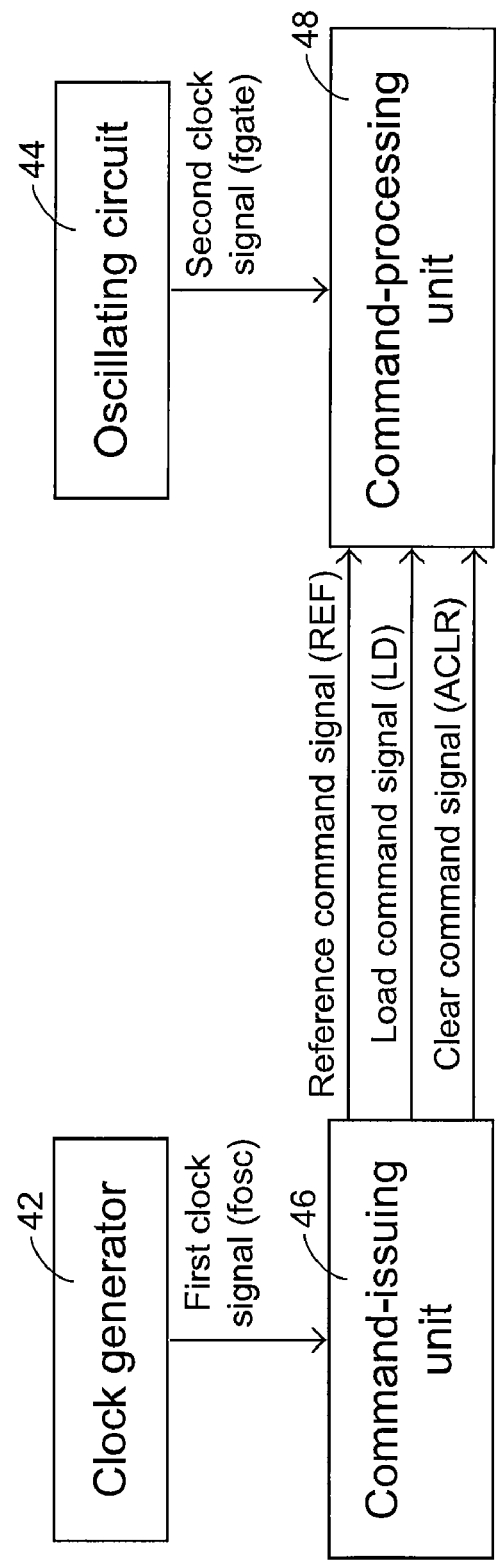
FIG. 4 is a functional block diagram showing a digital temperature detecting system of the present invention.

FIG. 4 depicts a functional block diagram of a digital temperature detecting system of this present invention. The digital temperature detecting system includes a clock generator 42, an oscillating circuit 44 having a number of P Not gates coupled in series, a command issuing unit 46, and a command processing unit 48.

The clock generator 42 serves to output a first clock signal having a first frequency $f_{osc}$. The oscillating circuit 44 serves to output a second clock signal having a second frequency $f_{gate}$. The command issuing unit 46, connected to the clock generator 42, serves to output a reference command signal (RF), a load command signal (LD), and a clear command signal (ACLR) in response to the first clock signal derived from the clock generator 42. The command processing unit 48, connected to the oscillating circuit 44 and the command issuing unit 46, serves to count the clocks generated in the second clock signal in a counting duration which is designated by the reference command signal (RF), and to detect the working temperature or to estimate the gate delay time ($\Delta t$) according to the number of the counted clocks.

Figure 5:
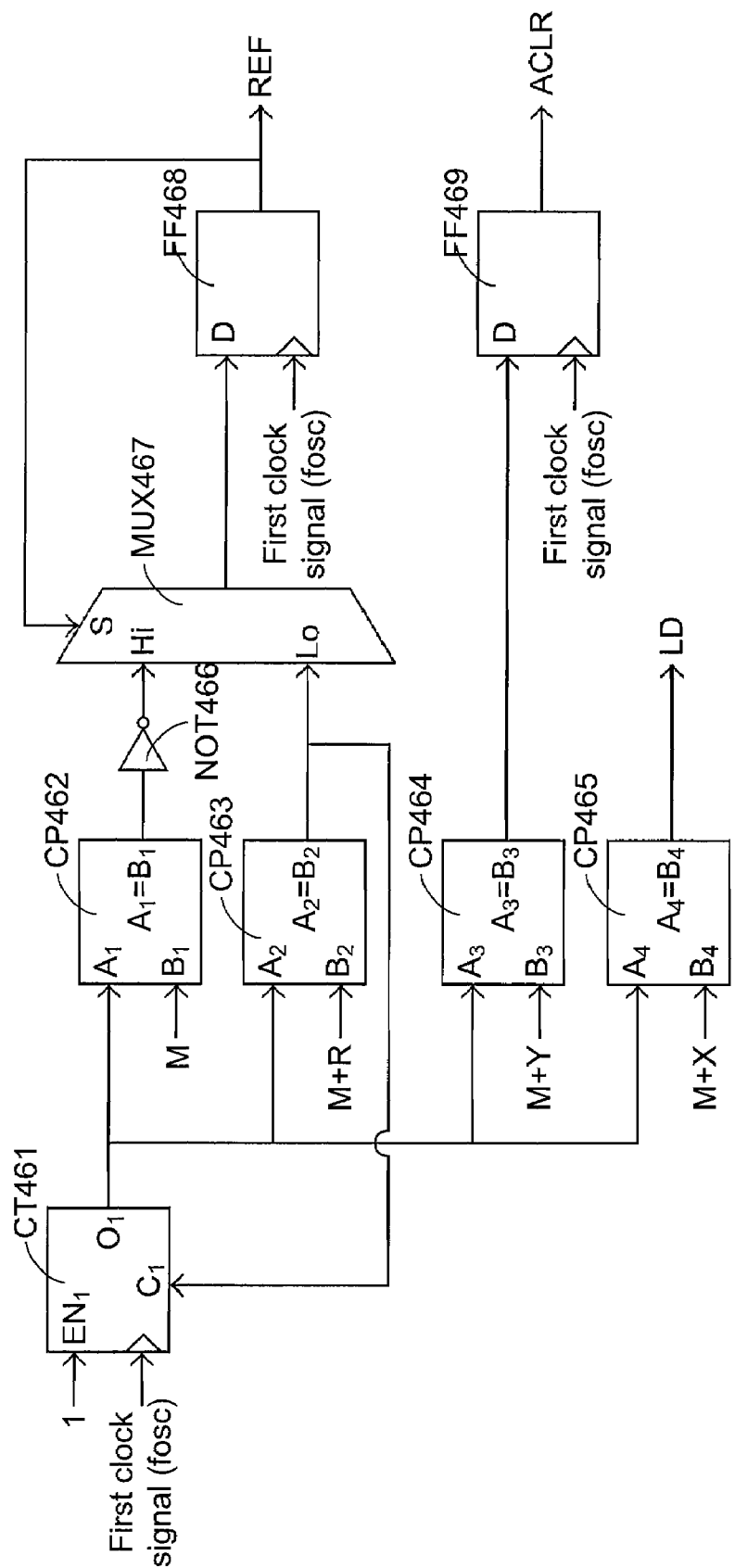
FIG. 5 is a schematic diagram showing the circuit configuration of the command-issuing unit of the present invention.

FIG. 5 is a schematic diagram showing the circuit configuration of the command-issuing unit 46. The command issuing unit 46 includes a counter CT461, four comparators CP462, CP463, CP464, and CP465, a Not gate NOT466, a multiplexer MUX467, and two D Flip-Flops FF468 and FF469.

The counter CT461 has an enable terminal (EN1) to which an input signal in the logic high state (i.e., input signal=1) is applied, and a clock-input terminal to which the first clock signal is applied. The counter CT461 serves to count the clocks generated in the first clock signal and the number of the counted clocks is defined as a first counting number. The comparator CP462 has a first input terminal (A1) connected to an output terminal (O1) of the counter CT461, and a second input terminal (B1) to which a value M is applied. The comparator CP463 has a first input terminal (A2) connected to the output terminal (O1) of the counter CT461, a second input terminal (B2) to which a value M+R is applied, and an output terminal (A2=B2) connected to a clear terminal (C1) of the counter CT461. The comparator CP464 has a first input terminal (A3) connected to the output terminal (O1) of the counter CT461, and a second input terminal (B3) to which a value M+Y is applied. The comparator CP465 has a first input terminal (A4) connected to the output terminal (O1) of the counter CT461, a second input terminal (B4) to which a value M+X is applied, and an output terminal (A4=B4) from which the load command signal (LD) is derived. The Not gate NOT466 has an input terminal connected to an output terminal (A1=B1) of the comparator CP462. The multiplexer MUX467 has a first input terminal (Hi) connected to an output terminal of the Not gate NOT466, and a second input terminal (Lo) connected to the output terminal (A2=B2) of the comparator CP463. The D Flip-Flop FF468 has an input terminal connected to an output terminal of the multiplexer MUX467, a clock-input terminal to which the first clock signal is applied, and an output terminal connected to a select terminal (S) of the multiplexer MUX467, wherein the reference command signal (REF) is derived from the output terminal of the D Flip-Flop FF468. The D Flip-Flop FF469 has an input terminal connected to an output terminal (A3=B3) of the comparator CP464, a clock-input terminal to which the first clock signal is applied, and an output terminal from which the clear command signal (ACLR) is derived.

The counter CT461 starts to count the clocks generated in the first clock signal when an input signal in the logic high state (i.e., input signal=1) is applied to the enable terminal (EN1) of the counter CT461, and the number of the counted clocks (the first counting number) is reset to 0 when an input signal in the logic high state (i.e., input signal=1) is applied to the clear terminal (C1) of the counter CT461. An output signal in the logic high state (i.e., output signal=1) is derived from the output terminal of each comparator CP462, CP463, CP464, and CP465 if the two input terminals of each comparator are applied to a same value. Alternatively, the output signal in the logic low state (i.e., output signal=0) is derived if the two input terminals of each comparator are applied to two different values.

Figure 6:
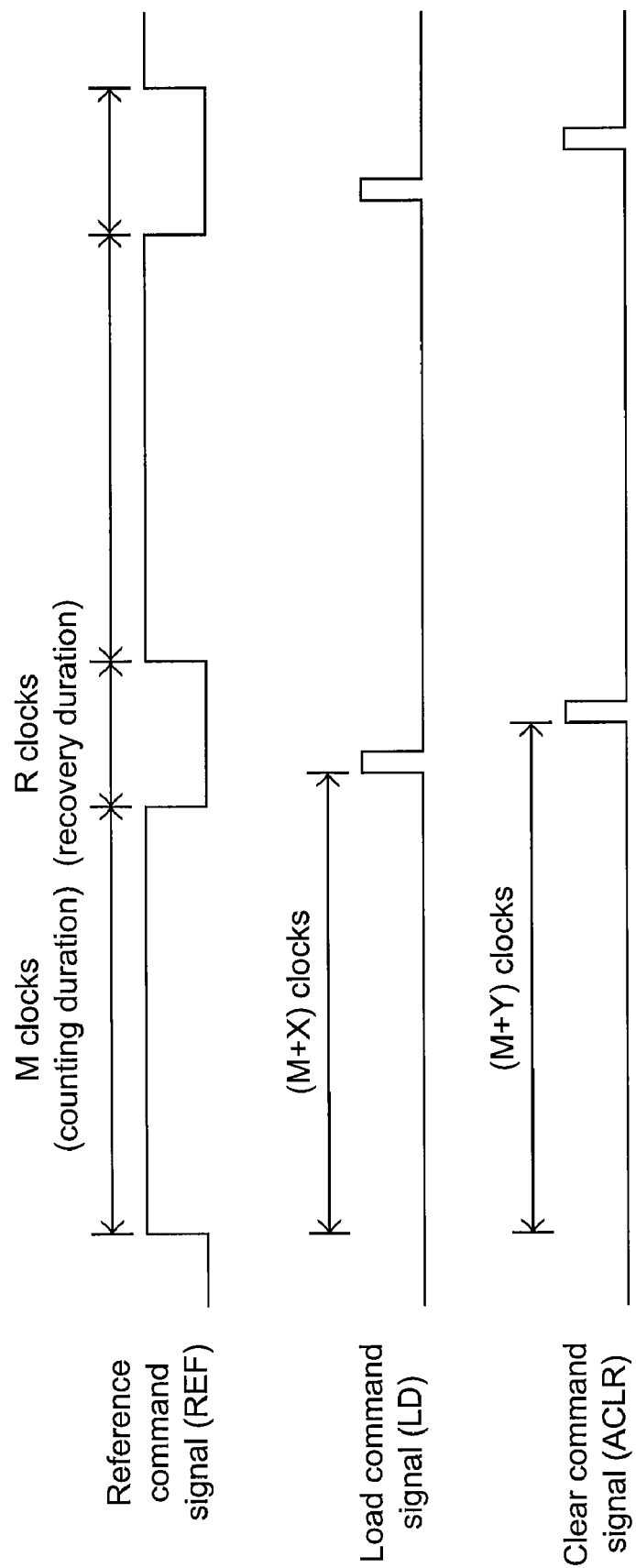
FIG. 6 is a timing diagram showing the change of the individual signals derived from the command-issuing unit of the present invention.

FIG. 6 depicts the timing diagrams showing the change of the reference command signal (REF), the load command signal (LD), and the clear command signal (ACLR) derived from the command-issuing unit 46. When the first clock signal is derived from the clock generator 42 and applied to the clock-input terminal of the counter CT461, the counter CT461 starts to count the clocks generated in the first clock signal, so as the first counting number is generated by the counter CT461. Next, the first counting number is further transmitted from the output terminal (O1) of the counter CT461 to the first input terminals of the comparators CP462, CP463, CP464, and CP465. Before the first counting number derived from the counter CT461 reaching the value M, the output signal derived from the output terminal (A1=B1) of the comparator CP462 is kept at the logic low state (i.e., output signal=0). The signal in the logic low state (i.e., signal=0) is further transmitted to the input terminal of the Not gate NOT466, and then an output signal in the logic high state (i.e., output signal=1) is derived from the output terminal of the Not gate NOT466. The signal in the logic high state (i.e., signal=1) is further transmitted to the multiplexer MUX467 and the D Flip-Flop FF468, so as the reference command signal (REF) derived from the output terminal of the D Flip-Flop FF468 is also in the logic high state (i.e., REF=1). At this stage of the first counting number less than the value M, the reference command signal (REF) is fixed at the logic high state (i.e., REF=1).

When the first counting number derived from the counter CT461 reaches to the value M, an output signal in the logic high state (i.e., output signal=1) is derived from the output terminal (A1=B1) of the comparator CP462. The output signal is further transmitted to the input terminal of the Not gate NOT466, so as an output signal in the logic low state (i.e., output signal=0) is derived from the output terminal of the Not gate NOT466. The signal in the logic low state (i.e., signal=0) is further transmitted to the multiplexer MUX467 and the D Flip-Flop FF468, so as the reference command signal (REF) derived from the output terminal of the D Flip-Flop FF468 is in the logic low state (i.e., REF=0). Because the reference command signal (REF) is in the logic low state (i.e., REF=0) and fed back to the select terminal (S) of the multiplexer MUX467, the output signal derived from the output terminal (A2=B2) of the comparator CP463 is selected and applied to the multiplexer MUX467, and then further transmitted to the D Flip-Flop FF468. At this stage of the first counting number is larger than the value M but less than the value M+R, the reference command signal (REF) is fixed at the logic low state (i.e., REF=0).

When the first counting number derived from the counter CT461 reaches to the value M+R, an output signal in the logic high state (i.e., output signal=1) is derived from the output terminal (A2=B2) of the comparator CP463, and the signal is further transmitted to the multiplexer MUX467 and the D Flip-Flop FF468, so as the reference command signal (REF) derived from the output terminal of the D Flip-Flop FF468 is in the logic high state (i.e., REF=1). Because the reference command signal (REF) is in the logic high state (i.e., REF=1) and fed back to the select terminal (S) of the multiplexer MUX467, the output signal which is derived from the output terminal (A1=B1) of the comparator CP462 is selected and applied to the multiplexer MUX467 after through the Not gate NOT466, and then further transmitted to the D Flip-Flop FF468. At this stage of the first counting number reaching to the value M+R, the output signal derived from the output terminal (A1=B1) of the comparator CP462 is at the logic low state (i.e., output signal=0), so as the reference command signal (REF) is at the logic high state (i.e., REF=1). Meanwhile, the output signal, in the logic high state (i.e., output signal=1) and derived from the output terminal (A2=B2) of the comparator CP463, is also fed back to the clear terminal (C1) of the counter CT461 to reset the first counting number to 0. Then, before the first counting number is reaching to the value M or after the first counting number is reset to 0, the output signal derived from the output terminal (A1=B1) of the comparator comparator 462 is kept at the logic low state (i.e., output signal=0), so as the reference command signal (REF) is in the logic high state (i.e., REF=1).

Additionally, when the first counting number derived from the counter CT461 reaches to the value M+Y, an output signal in the logic high state (i.e., output signal=1) is derived from the output terminal (A3=B3) of the comparator CP464, and then further transmitted to the D Flip-Flop FF469, so as the clear command signal (ACLR) having a pulse with a width of a clock is derived from the output terminal of the D Flip-Flop FF469. Similarly, when the first counting number derived from the counter CT461 reaches to the value M+X, an output signal in the logic high state (i.e., output signal=1) is derived from the output terminal (A4=B4) of the comparator CP465, so as the load command signal (LD) having a pulse with a width of a clock is derived is derived from the output terminal of the comparator CP465.

In the embodiment of this present invention, R is greater than Y, and Y is greater than X. Therefore, as depicted in FIG. 6, a state in the logic high (i.e., state=1) with a width of M clocks and a state in the logic low (i.e., state=0) with a width of R clocks are periodically generated in the reference command signal (REF), wherein the duration of the M clocks having a logic high state (i.e., state=1) is defined as a counting duration, and the duration of the R clocks having a logic low state (i.e., state=0) is defined as a recovery duration. A pulse with a width of a clock is periodically generated in the load command signal (LD) when the first counting number reaching to value M+X. Similarly, A pulse with a width of a clock is periodically generated in the clear command signal (ACLR) when the first counting number reaching to value M+Y.

Figure 7:
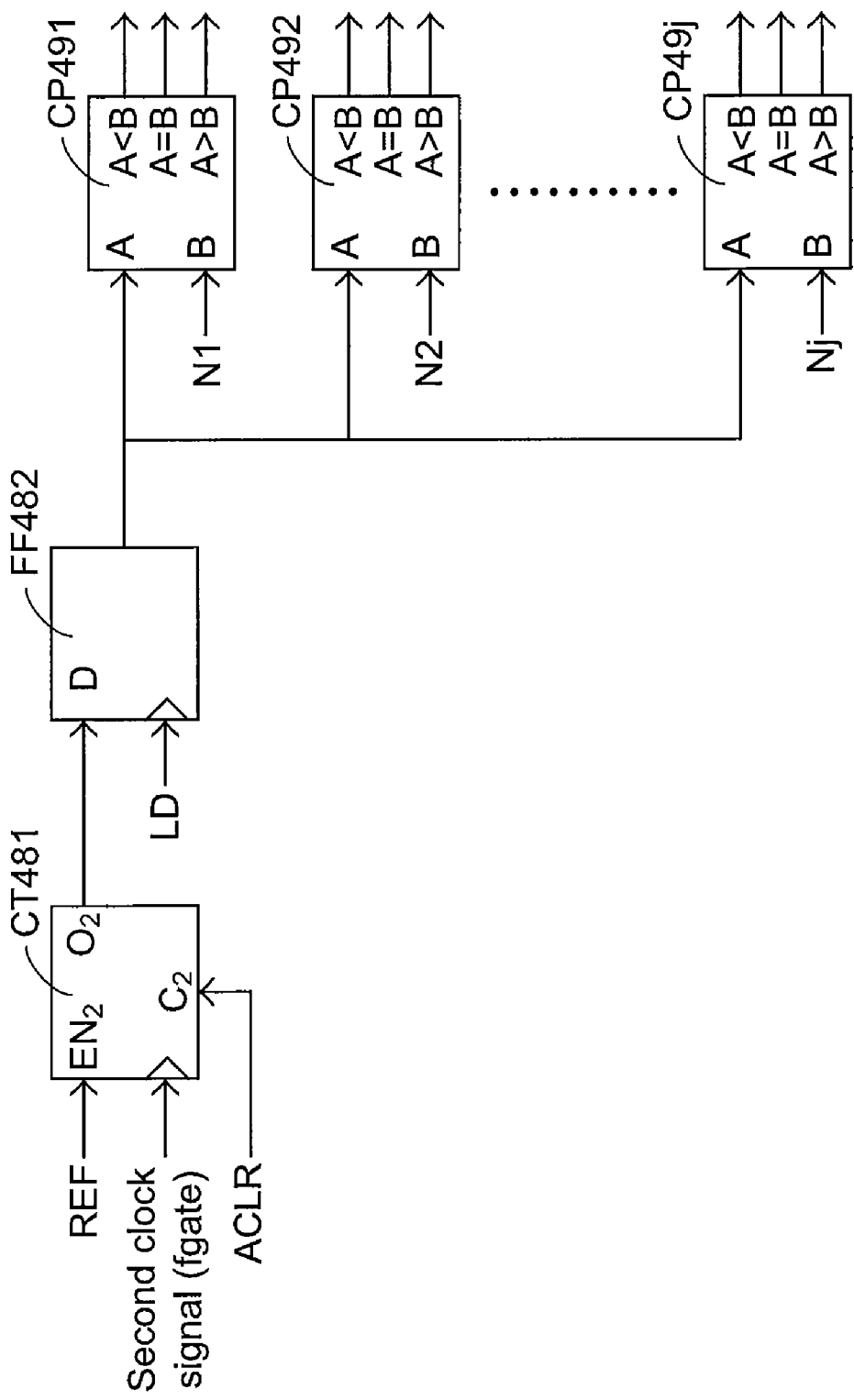
FIG. 7 is a schematic diagram showing the circuit configuration of the command-processing unit of the present invention.

FIG. 7 is a schematic diagram showing the circuit configuration of the command-processing unit 48. The command processing unit 48 includes a counter CT481, a D Flip-Flop FF482, and comparators CP491~CP49j.

The counter CT481 has an enable terminal (EN2) to which the reference command signal (REF) is applied, a clear terminal (C2) to which the clear command signal (ACLR) is applied, and a clock-input terminal to which the second clock signal is applied. The D Flip-Flop FF482 has an input terminal connected to an output terminal (O2) of the counter CT481, and a clock-input terminal to which the load command signal (LD) is applied. Each comparator CP491~CP49j has a first input terminal connected to an output terminal of the D Flip-Flop FF482, a second input terminal to which a predefined value N1~Nj is applied respectively, and a plurality of output terminals for reference the comparing relationship between the value applied to the first input terminal and the predefined value applied to the second input terminal. For example, each comparator CP491~CP49j has three output terminals, and these three output terminals refer to the value applied to the first input terminal is less than the predefined value applied to the second input terminal (A<B), the value applied to the first input terminal is equal to the predefined value applied to the second input terminal (A=B), and the value applied to the first input terminal is greater than the predefined value applied to the second input terminal (A>B), respectively.

The counter CT481 starts to count the clocks generated in the second clock signal when an input signal in the logic high state (i.e., input signal=1) is applied to the enable terminal (EN2) of the counter CT481, and the number of the counted clocks in the second clock signal is defined as a second counting number. The second counting number is reset to 0 when an input signal in the logic high state (i.e., input signal=1) is applied to the clear terminal (C2) of the counter CT481. Each comparator CP1~CPj compares the value applied to the first input terminal with the predefined value applied to the second terminal, and an output signal in the logic high state (i.e., output signal=1) is derived from one of these output terminals if the output terminal is corresponding to the comparing result, and an output signal in the logic low state (i.e., output signal=0) is derived from the rest two output terminals.

In the counting duration, or the reference command signal (REF) derived from the command issuing unit 46 is in the logic high state (i.e., RF=1), the counter CT481 keeps counting the clocks generated in the second clock signal to generate the second counting number. At the end of the counting duration, or the reference command signal (REF) begins to turn to the logic low state (i.e., RF=0), the counter CT481 stops counting the clocks generated in the second clock signal.

At the end of the counting duration, or at the beginning of the recovery duration, the second counting number derived from the counter CT481 is not latched to the output terminal of the D Flip-Flop FF482 until the load command signal (LD) in the logic high state (i.e., LD=1) is applied to the D Flip-Flop FF482. Then, each comparator CP1~CPj can respectively compare the second counting number applied to the first input terminal with the predefined value (N1~Nj) applied to the second terminal, and then the comparing result is derived from the output terminal of each comparator CP1~CPj.

In the recovery duration, the second counting number is reset to 0 when the clear command signal (ACLR) in the logic high state (i.e., ACLR=1) is applied to the clear terminal (C2) of the counter CT481. Then, the counter CT481 starts to re-count the clocks generated in the second clock signal to re-generate the second counting number when the reference command signal (REF) derived from the command issuing unit 46 is in the logic high state (i.e., REF=1).

According to the embodiment of this present invention, the working temperature or the gate delay time (Δt) of the chip can be measured through the comparing results derived from the comparators CP1~CPj. For example, if the predefined values N1<N2<...<Nj, the value less than N1 is defined to a low-working-temperature range, the value between N1 and N2 is defined to a normal-working-temperature range, the value between N2 and N3 is defined to a high-working-temperature range, and the value larger than N4 is defined to an over-working-temperature range. When the second counting number is less than the predefined value N1, an output signal in the logic high state (i.e., output signal=1) is derived from the output terminal (A<B) of the comparator CP491, and an output signal in the logic low state (i.e., output signal=0) is derived from the rest output terminals. Therefore, the working temperature of the chip can be determined to located within the low-working-temperature range according to the comparing result derived from the comparators CP1~CPj. Because the clear command signal (ACLR) is periodically applied to the counter CT481, the second counting number is periodically reset to 0. Because the load command signal (LD) is periodically applied to the D Flip-Flop FF482, the second counting number is periodically latched to the output terminal of the D Flip-Flop FF482. Therefore, the working temperature can be updated periodically according to the comparing results from the comparators CP1~CPj.

Moreover, the gate delay time (Δt) of each Not gate in the chip can be also measured according to the comparing result derived the comparators CP1~CPj through the equation:

$$M \times \frac{1}{f_{osc}} \times \frac{1}{N} \times \frac{1}{P}$$

where $$M \times \frac{1}{f_{osc}}$$

is the counting duration, N is the second counting number, and P is the number of the Not gates.

The spirit of this present invention can be also applied to an oscillating circuit built in a chip. The oscillating circuit at least includes Not gate NOT1 . . . NOTp coupled in series, wherein P is odd and an output terminal of the NOTp is fed back to an input terminal of the oscillating circuit. The Not gates NOT1~NOTp are not limit to coupled with other gates (i.e., Nor gate or Or gate) in series. The oscillating circuit can output a clock signal, and the gate delay time (Δt) of the oscillating circuit or the working temperature of the chip affects the frequency of the clock signal. Therefore, after comparing the frequency of the clock signal with an external clock signal, the gate delay time (Δt) of the oscillating circuit or the working temperature of the chip can be measured, wherein the external clock signal is not affected by the gate delay time (Δt) of the oscillating circuit or the working temperature of the chip at all.

As explained previously, the gate delay time (Δt) in the digital temperature detecting system and method of this present invention can measure a chip or the working temperature of the chip. The problems of the prior-art analog temperature detecting system taking up too much layout area in a chip and a complicate design for the analog circuit can be avoided, so as the problem of unable physically to measure the gate delay time (Δt) in a chip can be solved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A digital temperature detecting system, comprising:
a clock generator generating a first clock signal having a constant frequency;
an oscillating circuit including a plurality of Not gates coupled in series and generating a second clock signal, wherein a total number of the Not gates is an odd number;
a command issuing unit connected to the clock generator and generating a reference command signal according to the first clock signal, wherein a counting duration is periodically generated in the reference command signal; and a command processing unit connected to the command issuing unit and the oscillating circuit and generating a counting number through counting the clocks generated in the second clock signal in the counting duration realized by receiving the reference command signal from the command issuing unit and determining a working temperature according to the counting number.

2. The digital temperature detecting system according to claim 1, wherein an output terminal of the last Not gate is fed back to an input terminal of the first Not gate in the oscillating circuit.

3. The digital temperature detecting system according to claim 1, wherein a frequency of the second clock signal correlates to a gate delay time of the Not gates, and the gate delay time further correlates to the working temperature.

4. The digital temperature detecting system according to claim 1, wherein the counting duration and a recovery duration are periodically generated in the reference command signal, and the working temperature is determined by the counting number in the recovery duration.

5. The digital temperature detecting system according to claim 4, wherein the command processing unit can estimate a gate delay time in the recovery duration according to the counting number.

6. The digital temperature detecting system according to claim 4, wherein the command issuing unit further generates a load command signal for updating the counting number in the recovery duration.

7. The digital temperature detecting system according to claim 4, wherein the command issuing unit further generates a clear command signal for resetting the counting number in the recovery duration.

8. The digital temperature detecting system according to claim 1, wherein the command issuing unit further comprises:
a first counter having an enable terminal to which an input signal in a logic high state is applied and a clock-input terminal to which the first clock signal is applied, for generating a first counting number through counting the clocks generated in the first clock signal;
a first comparator having a first input terminal connected to an output terminal of the first counter and a second input terminal to which a first value is applied;
a second comparator having a first input terminal connected to the output terminal of the first counter, a second input terminal to which a second value is applied, and an output terminal connected to a clear terminal of the first counter;
a third comparator having a first input terminal connected to the output terminal of the first counter and a second input terminal to which a third value is applied;
a fourth comparator having a first input terminal connected to the output terminal of the first counter, a second input terminal to which a fourth value is applied, and an output terminal from which a load command signal is derived;
a Not gate having an input terminal connected to an output terminal of the first comparator;
a multiplexer having a first input terminal connected to an output terminal of the Not gate, a second input terminal connected to the output terminal of the second comparator;
a first D Flip-Flop having an input terminal connected to an output terminal of the multiplexer, a clock-input terminal to which the first clock signal is applied, and an output terminal, connected to a select terminal of the multiplexer, for outputting the reference command signal; and
a second D Flip-Flop having an input terminal connected to an output terminal of the third comparator, a clock-input terminal to which the first clock signal is applied, an output terminal from which a clear command signal is derived.

9. The digital temperature detecting system according to claim 8, wherein the second value is greater than the third value, the third value is greater than the fourth value, and the fourth value is greater than the first value.

10. The digital temperature detecting system according to claim 8, wherein the command-processing unit further comprises:
a second counter having an enable terminal to which the reference command signal is applied, a clear terminal to which the clear command signal is applied, and a clock-input terminal to which the second clock signal is applied;
a third D Flip-Flop having an input terminal connected to an output terminal of the second counter, and a clock-input terminal to which the load command signal is applied; and
a plurality of comparators all connected to an output terminal of the third D Flip-Flop, wherein each comparator has a predefined comparing value, and a comparing result is derived from each comparator after these predefined values are compared to the counting number derived from the output terminal of the third D Flip-Flop.

11. The digital temperature detecting system according to claim 10, wherein the working temperature is determined by the comparing results.

12. The digital temperature detecting system according to claim 10, wherein a gate delay time is determined by the comparing results.

* * * * *